US010465458B2

United States Patent
Ruehmann et al.

(10) Patent No.: US 10,465,458 B2
(45) Date of Patent: Nov. 5, 2019

(54) APPARATUS AND METHOD OF CONNECTING TUBULARS

(71) Applicant: Weatherford Technology Holdings, LLC, Houston, TX (US)

(72) Inventors: Rainer Ruehmann, Hannover (DE); Christina Karin Hebebrand, Hannover (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 195 days.

(21) Appl. No.: 15/455,515

(22) Filed: Mar. 10, 2017

(65) Prior Publication Data
US 2018/0223609 A1     Aug. 9, 2018

Related U.S. Application Data
(60) Provisional application No. 62/454,382, filed on Feb. 3, 2017.

(51) Int. Cl.
*E21B 19/16*     (2006.01)
*E21B 17/042*     (2006.01)
*G01L 5/24*     (2006.01)

(52) U.S. Cl.
CPC .......... *E21B 19/166* (2013.01); *E21B 17/042* (2013.01); *E21B 19/161* (2013.01); *E21B 19/165* (2013.01); *G01L 5/24* (2013.01)

(58) Field of Classification Search
CPC .... E21B 19/166; E21B 19/165; E21B 17/042; E21B 19/16; G01L 5/24
See application file for complete search history.

(56) References Cited

U.S. PATENT DOCUMENTS

| | | | | |
|---|---|---|---|---|
| 4,738,145 | A | * | 4/1988 | Vincent .................. B25B 23/14 29/407.02 |
| RE33,526 | E | * | 1/1991 | Coyle, Sr. ............ B25B 23/145 173/177 |
| RE34,063 | E | * | 9/1992 | Vincent ................ B23P 19/066 29/407.02 |
| 5,245,265 | A | * | 9/1993 | Clay ...................... B23P 19/06 318/432 |
| 6,082,224 | A | | 7/2000 | McDaniels et al. |
| 6,212,763 | B1 | * | 4/2001 | Newman ............... B25B 21/002 173/180 |

(Continued)

FOREIGN PATENT DOCUMENTS

DE    102014210860 A1    12/2015
WO    2005045177 A1    5/2005

OTHER PUBLICATIONS

PCT International Search Report and Written Opinion dated May 7, 2018, for International Application No. PCT/US2018/016480.

*Primary Examiner* — Michael R Wills, III
(74) *Attorney, Agent, or Firm* — Patterson+ Sheridan, LLP

(57) ABSTRACT

The present disclosure generally relates to a method for making up a tubular joint. The method includes rotating a first tubular relative to a second tubular to engage the first and second tubulars while measuring a torque between the first and second tubulars, calculating a set point of a relative rotational speed between the first and second tubulars using the measured torque, and using the calculated set point with a closed-loop controller to control the relative rotational speed between the first and second tubulars.

19 Claims, 7 Drawing Sheets

(56) References Cited

U.S. PATENT DOCUMENTS

| | | | |
|---|---|---|---|
| 8,726,743 B2* | 5/2014 | Ruehmann | G01L 5/24 |
| | | | 73/761 |
| 2004/0144547 A1* | 7/2004 | Koithan | E21B 19/07 |
| | | | 166/380 |
| 2007/0107912 A1* | 5/2007 | Boutwell | E21B 19/165 |
| | | | 166/380 |
| 2009/0266539 A1* | 10/2009 | Ruark | E21B 19/166 |
| | | | 166/250.01 |
| 2010/0132180 A1 | 6/2010 | Conquergood et al. | |
| 2012/0330552 A1 | 12/2012 | Conquergood et al. | |
| 2017/0211344 A1 | 7/2017 | Aalderink et al. | |

\* cited by examiner

APPARATUS AND METHOD OF CONNECTING TUBULARS

BACKGROUND

Field

The present disclosure generally relates to makeup tools and, more specifically, to methods and apparatus for achieving target torque in tubular makeup.

Description of the Related Art

Construction of oil or gas wells usually requires making long tubular strings that make up casing, risers, drill pipe or other tubing. Due to the length of these strings, sections or stands of tubulars are progressively added to or removed from the tubular strings as they are lowered or raised from a drilling platform.

The tubular strings are formed by connecting a plurality of tubulars by fluid-tight threaded joints. Each fluid-tight threaded joint is formed by making up two tubulars with a threaded connection at a target torque.

A tong assembly is commonly used to make up or break out joints in the tubular strings. Typically, a tong assembly may be manually controlled by an operator during makeup. A dump valve is usually used to stop the rotation when a at a target torque. Depending on parameters of the tubulars, this manual control may lead to over torque, for example, when the rotational speed of the tong assembly is too high at a final stage of joint make up. Another approach to achieve the target torque is using a closed-loop control of torque or rotational speed during makeup. However, depending on the set speed, the closed-loop control method takes a long time to makeup each joint. Another approach to achieve the target torque is to rotate the tong assembly for a predetermined time at a constant speed. The predetermined time is obtained from heuristically measured values, which are results of particular parameters, such as the reactions time of the tong assembly to a specific type of tubulars and the speed of the tong assembly.

Therefore, there is a need for improved methods for achieving target torques during tubular makeup.

SUMMARY

The present disclosure generally relates to a tong assembly for making up and breaking out a tubular connection such as a connection between two tubulars in a tubular string.

One embodiment provides a method for making up a tubular joint. The method includes rotating a first tubular relative to a second tubular to engage the first and second tubulars while measuring a torque between the first and second tubulars, calculating a set point of a relative rotational speed between the first and second tubulars using the measured torque, and using the calculated set point with a closed-loop controller to control the relative rotational speed between the first and second tubulars.

Another embodiment provides a method for making up a tubular joint. The method includes relatively rotating a first tubular to a second tubular to engage the first tubular and the second tubular while measuring a torque between the first and second tubulars, and automatically reducing a speed of relative rotation between the first and second tubulars using a closed-loop controller when the measured torque reaches a start point.

Yet another embodiment provides a tubular makeup system. The tubular makeup system includes a tubular makeup assembly comprising a first clamp for clamping to a first tubular, and a second clamp for clamping to a second tubular, wherein the first clamp and the second clamp are arranged to rotate the second tubular relative to the first tubular to make a tubular connection. The tubular makeup system further includes a controller including a control program, when operating, controlling a relative rotational speed between the first clamp and second clamp using a closed-loop controller, and calculating a set point for the closed-loop controller from a measured torque value between the first and second tubulars.

Yet another embodiment provides a tubular makeup system. The system includes a tong assembly comprising a backup tong for clamping to a first tubular, and a power tong for clamping to a second tubular and rotating the second tubular relative to the first tubular. The system further includes a controller coupled to the tong assembly. The controller includes a control program, when operating, controlling a rotational speed of the power tong using a closed-loop controller, and calculating a set point for the closed-loop controller from a measured torque value between the first and second tubulars.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1A:
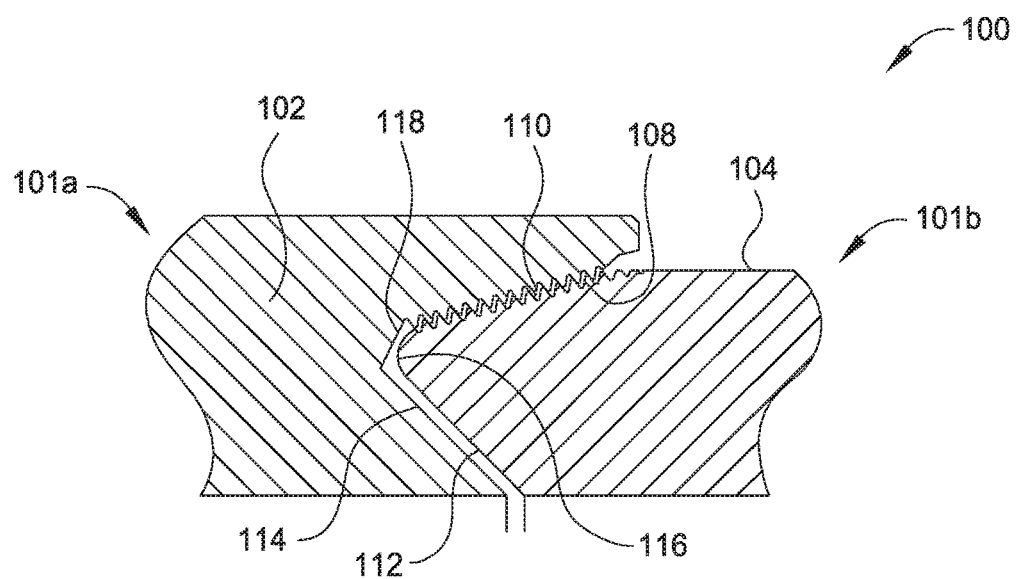
FIG. 1A is a schematic partial cross sectional view of a connection between threaded tubulars.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiment of the present disclosure relate to methods and apparatus for making up a tubular joint.

FIG. 1A is a schematic partial cross sectional view of a connection 100 between tubulars 101*a*, 101*b*. The tubulars 101*a*, 101*b* may be any oil and gas tubular goods, such as production tubing, casing, liner, drill pipe, or couplings. The tubulars 101*a*, 101*b* may be made from a metal or alloy, such as plain carbon steel, low alloy steel, high strength low alloy steel, stainless steel, or a nickel based alloy. Ends of each tubular 101*a*, 101*b* may have be a pin end or a box end. A pin end 104 of a tubular may be connected to a box end of another tubular to form a tubular connection.

FIG. 1A schematically illustrates a pin end 104 of the tubular 101*b* connecting to a box end 102 of the tubular 101*a*. The pin end 104 has a tapered externally-threaded surface 108. The box end 102 has a mating tapered internally-threaded surface 110. The pin end 104 may include a torque shoulder 112. The torque shoulder 112 co-operates with a corresponding torque shoulder 114 on the box end 102. An annular sealing area 116 is defined at a terminal end of the pin end 104. The annular sealing area 116 is shaped to engage with a co-operating annular sealing area 118 on the box end 102. The annular sealing surface 118 is defined between the tapered internal threaded surface 110 and the torque shoulder 114. Alternatively, the sealing areas 116, 118 may be located at other positions in the box end 102 and the pin end 104.

As shown in FIG. 1A, during makeup, the box end 102 engages with the pin end 104 as the external threaded surface 108 on the pin end 104 is screwed into the internal threaded surface 110 on the box end 102 by relative rotation between the tubulars 101*a*, 101*b*. The continued rotation between the tubulars 101*a*, 101*b* to engage the threaded 110, 108 is referred to as the spin-in position. In the spin-in, the torque between the tubulars 101*a*, 101*b* is nominal, near zero.

Figure 1B:
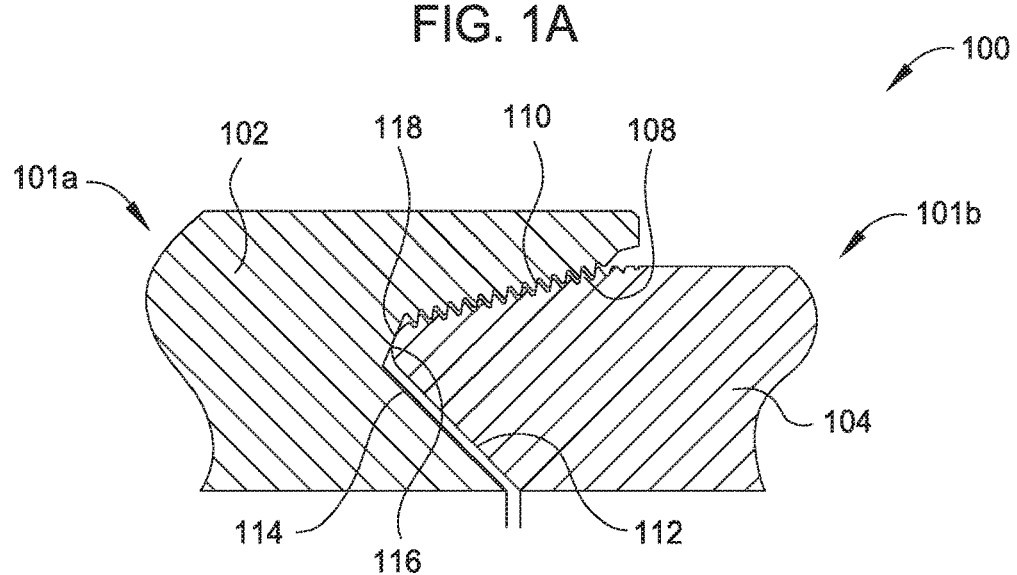
FIG. 1B is a schematic partial cross sectional view of the connection of FIG. 1A in a seal position.

As the relative rotation continues, the annular sealing areas 116, 118 contact one another, as shown in FIG. 1B. This initial contact between the sealing areas 116, 118 is referred to as the "seal position". At the seal position, the torque shoulders 112, 114 do not contact one another. Further relative rotation between the tubulars 101*a*, 101*b* from the seal position, the torque applied between the tubulars 101*a*, 101*b* increases.

Figure 1C:
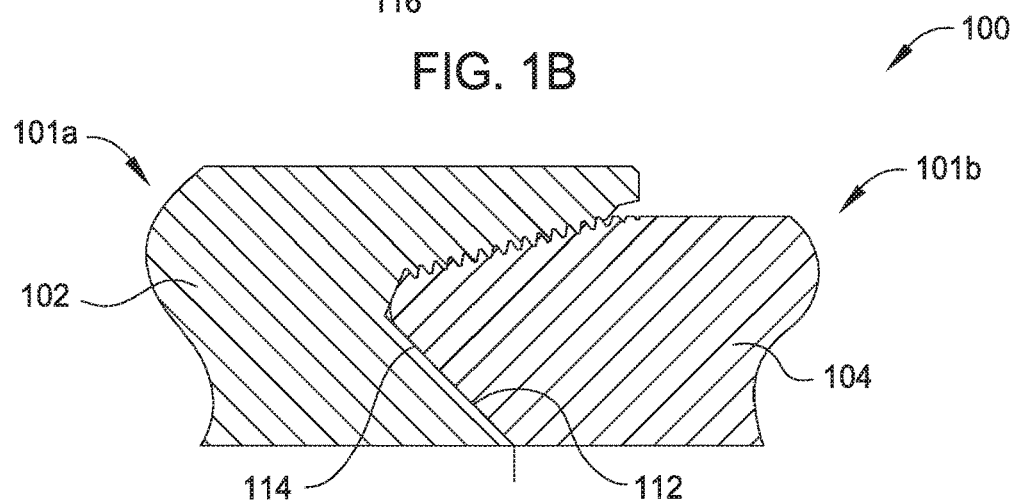
FIG. 1C is a schematic partial cross sectional view of the connection of FIG. 1A in a shoulder position.

Further rotations between the tubulars 101*a*, 101*b* from the seal position leads to the co-operating tapered torque shoulders 112, 114 contacting and bearing against one another at a machine detectable stage referred to as a "shoulder position", as shown in FIG. 1C. The increasing pressure interface between the tapered torque shoulders 112, 114 cause the sealing areas 116, 118 to be forced into a tighter metal-to-metal sealing engagement with each other causing deformation of the sealing area 116 and eventually forming a fluid-tight seal. The shoulder position may be detected by the value of the torque applied between the tubulars 101*a*, 101*b*.

During makeup of the tubulars 101*a*, 101*b*, torque applied between the tubulars 101*a*, 101*b* changes as the engagement progresses from the spin-on position through the seal position and the shoulder position to a final position. The final position of the connection corresponds to a final torque applied between the tubulars 101*a*, 101*b*.

Quality of the tubular connection 100 may be measured by the final torque. For example, a good connection may have a final torque that is within a tolerable range of a target torque. Another criterion for the quality of the tubular connection is the torque-turn curve during the makeup. For example, torque spikes on the torque-turn curve may indicate a problematic connection.

Embodiments of the present disclosure provide methods and apparatus to create tubular connections of good quality. Particularly, embodiments of the present disclosure provide a method for achieving the target torque in a tubular connection by controlling a speed of relative rotation of the tubulars according to measured torque applied between the tubulars during at least a portion of the makeup process.

Figure 2A:
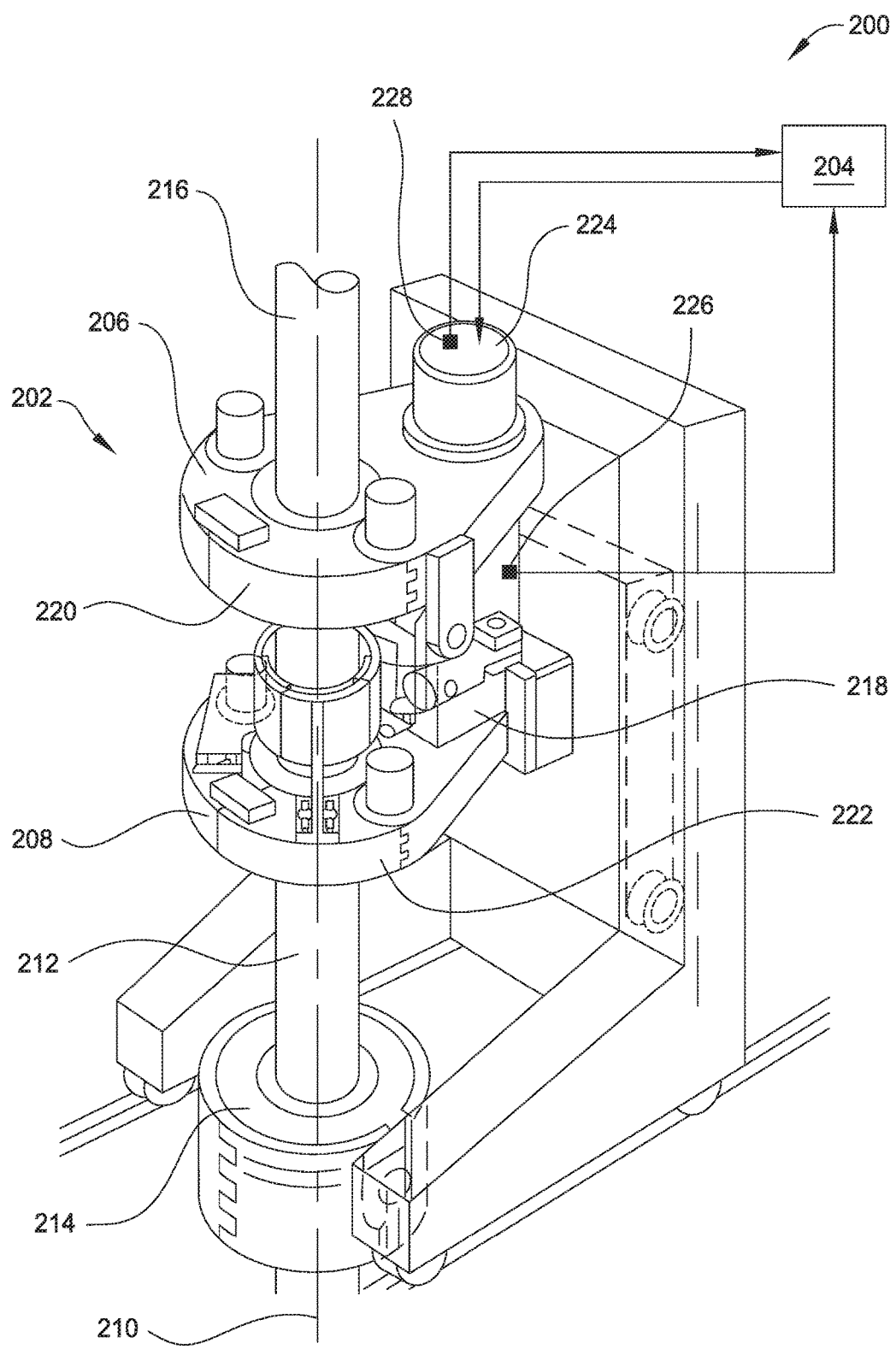
FIG. 2A is a schematic perspective view of a tubular makeup system according to one embodiment of the present disclosure.

FIG. 2A is a schematic perspective view of a tubular makeup system 200 200 according to one embodiment of the present disclosure. The tubular makeup system 200 may include a tong assembly 202 and a controller 204 for controlling the tong assembly 202. The tong assembly 202 may include a power tong 206 and a backup tong 208. During operation, the tong assembly 202 may be placed on a drilling rig coaxially with a central axis 210 of a workstring 212. The tong assembly 202 may be disposed above a slip 214 on the drilling rig to add a tubular 216 to the workstring 212 or to remove the tubular 216 from the workstring 212 while the workstring 212 rests on the slip 214.

The power tong 206 and the backup tong 208 may be coupled together by a frame 218. In one embodiment, the power tong 206 may include a side door 220 which may open to receive or release a tubular and close to clamp the tubular in the power tong 206. Similarly, the backup tong 208 may include a side door 222 which may open to receive or release a tubular and close to clamp the tubular in the backup tong 208. The power tong 208 may include a drive unit 224 configured to rotate the tubular clamped in the power tong 208. The drive unit 224 may include a drive motor and a gear assembly.

During operation, the power tong 206 receives and clamps to a first tubular, such as the tubular 216, while the backup tong 208 receives and clamps to a second tubular, such as a top portion of the workstring 212. The power tong 206 rotates the first tubular while the backup tong 208 holds the second tubular still causing relative rotation between the first tubular and second tubular, thus, making up a connection between the first and second tubulars or breaking up the connection between the first and second tubulars.

In one embodiment, the tong assembly 202 may include one or more load cells 226 positioned to measure the torque applied to the tubulars being clamped in the tong assembly 202. In one embodiment, the load cell 226 may be disposed in a torque load path between the power tong 206 and the backup tong 208. Alternatively, the load cell 226 may be positioned to measure a displacement of the tong assembly 202. The measured displacement may be used to calculate the torque between the tubulars in the tong assembly 202.

The controller 204 may be connected to the drive unit 224. The controller 204 may send commands to control rotational speed of the power tong 206. The controller 204 may also monitor turns of the power tong 206. In one embodiment, the drive unit 224 may include a turns counter 228. The turns counter 228 may be connected to the controller 204 to monitor the rotation of the power tong 206.

In one embodiment, the controller 204 may be connected to the load cell 226. The controller 204 may use the measurements from the load cell 226 to monitor the torque applied between the tubulars in the tong assembly 202. In one embodiment, the controller 204 may include a control program, which when operated, generating commands to control rotational speed of the power tong 206 according to the measured torque applied between the tubulars in the tong assembly 202.

Figure 2B:
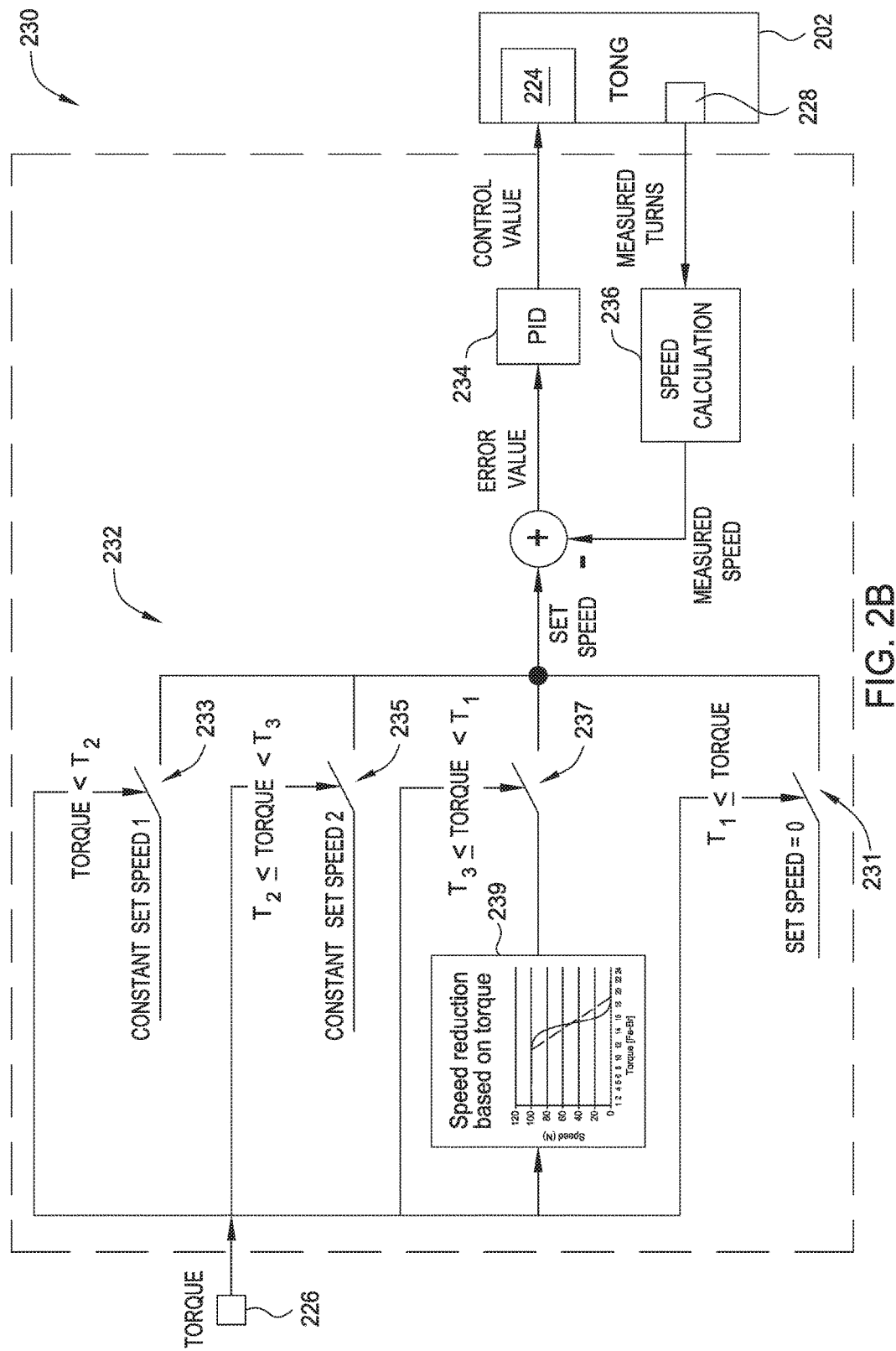
FIG. 2B is a schematic block diagram of a control program for the tubular makeup system of FIG. 2A.

FIG. 2B is a schematic block diagram of a control program 230 in the controller 204 of the tubular makeup system 200. The control program 230 is a closed-loop controller controlling the rotational speed of the tong assembly 202. The control program 230 may include a set point generator 232 configured to generate a set value for the rotational speed according to measured torque values, such as the measured torque values from the load cell 226. The set point from the set point generator is 232 is fed into a controller 234. In one embodiment, the controller 234 may be a proportional-integral-derivative (PID) controller. Measured turns from the tong assembly 202, such as from the turns counter 228, may be used to provide feedback to the controller 234. In one embodiment, the control program 230 may include a speed calculator 236 configured to generate measured rotational speed from the measured turns and feed the measured rotational speed to the controller 234. Even though the controller 234 described above is a PID controller, the controller 234 may be selected from any suitable closed-loop controller.

In one embodiment, the set point generator 232 includes switches 231, 233, 235, 237 to select a set speed according to measured torque. In one embodiment, the set point generator 232 may generate a higher set speed when the measured torque is lower and generate a lower set point when the measured torque is higher.

In the embodiment shown in FIG. 2B, when the measured torque is equal to or greater than a first torque value, T1, the switch 231 is switched on to set a zero set speed and stop the rotation immediately. In one embodiment, the first torque value may be the dump torque for the tubulars being made up.

When the measured torque is lower than second torque value, T2, the switch 233 may be switched on to set a first speed. In one embodiment, the first speed may be a constant speed. The second torque value may be corresponding to a minimum shoulder target value of the tubulars. The first speed may be the full speed of the tong assembly at a low gear.

When the measured torque is greater or equal to the second torque value, T2, and lower than a third torque value, T3, the switch 235 may be switched on to set a second speed. In one embodiment, the second speed may be a constant speed. For example, the second speed may be a reduced speed of the tong assembly at the lower gear.

When the measured torque is greater or equal to the third torque value, T3, and lower than the first torque value, T1, the switch 237 may be switched on to activate a set point calculator 239. In one embodiment, the third torque value may be a predetermined start point torque based on to the system reaction time and the target torque. The set point calculator 239 calculates a set point for the rotational speed for the makeup process, i.e., the set point for the rotational speed is a function of the measured torque. In one embodiment, the function between the measured torque and the set point may be selected to achieve zero rotational speed when the measured torque reaches a target torque. Additionally, the function between the measured torque and the set point may be selected to avoid torque spikes during the makeup operation.

Figure 3A:
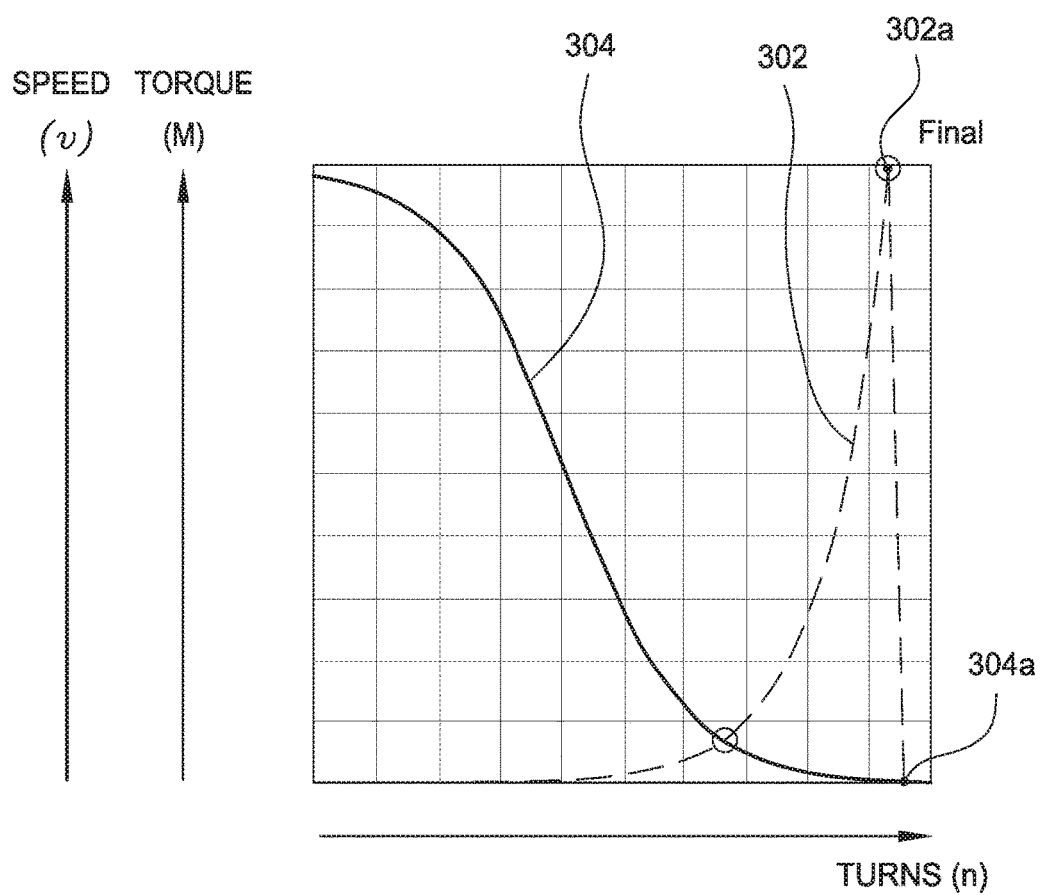
FIG. 3A is a schematic graph of a torque-turn curve and a speed-turn curve based on a sigmoidal function.

In one embodiment, the function between the measured torque and the set point of the rotational speed is a sigmoidal function. FIG. 3A is a schematic graph of a torque-turn curve 302 and a speed-turn curve 304 when the relative rotational speed v of the tubulars is calculated from the torque M from a standard sigmoidal function below:

$$v(M) = \frac{1}{1+e^M} \quad (1)$$

As shown in FIG. 3A, when the rotational speed is set from the torque according the standard sigmoidal function as shown in equation (1), a higher torque value leads to a lower speed. The rotational speed is zero at point 304a when the torque reaches a final value at point 302a. Both the torque-turn curve 302 and the speed-turn curve 304 are smooth without spikes. FIG. 3A illustrates that using the sigmoidal function to set the set point for rotational speed will result in a torque-turn curve without spikes.

According to embodiments of the present disclosure, the sigmoidal function (1) may be customized according to parameters of the tong assembly and the tubulars being made up. In one embodiment, the following customized sigmoidal function may be used to determine the set point of the rotational speed:

$$v(M) = \frac{(v_{max} - v_{min})}{1+e^{b*(M-M_c)}} + v_{min} \quad (2)$$

Where M denotes measured torque value;
v(M) denotes calculated speed set point;
$v_{max}$ denotes maximum speed (or start speed), which may be dependent of the tong assembly and the tubulars being connected;
$v_{min}$ denotes minimum speed (or end speed), which may be dependent of the tong assembly and the tubulars being connected;
b denotes a gradient of the sigmoidal function, which relates to a reaction window and may be a heuristically determined value; and
$M_c$ denotes a torque value of inflection point or a midpoint of the sigmoid function, which may be determined by torque parameters of the tubulars, for example, $M_c$ may be set as an optimum torque of the tubulars divided by 2.

Figure 3B:
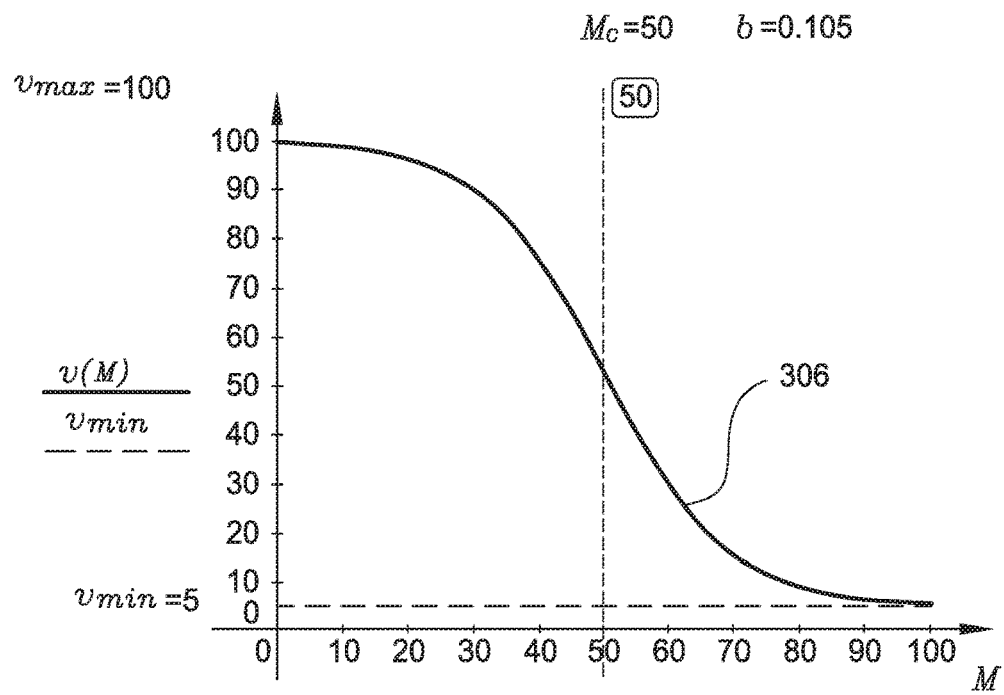
FIG. 3B is a schematic graph of a speed-torque curve based on a modified sigmoidal function.

FIG. 3B is a schematic graph of an exemplary speed-torque curve 306 according to the customized sigmoidal function. The speed-torque curve 306 is a normalized curve based on equation (2) where the measured torque value M may be between 0 to 100 (the measured torque at 100 corresponds to the optimum torque of the tubulars provided by the manufacture), $M_c$ is set to be 50, $v_{max}$ is set to be 100, $v_{min}$ is set to be 5, and the gradient b is set to be 0.105.

Figure 3C:
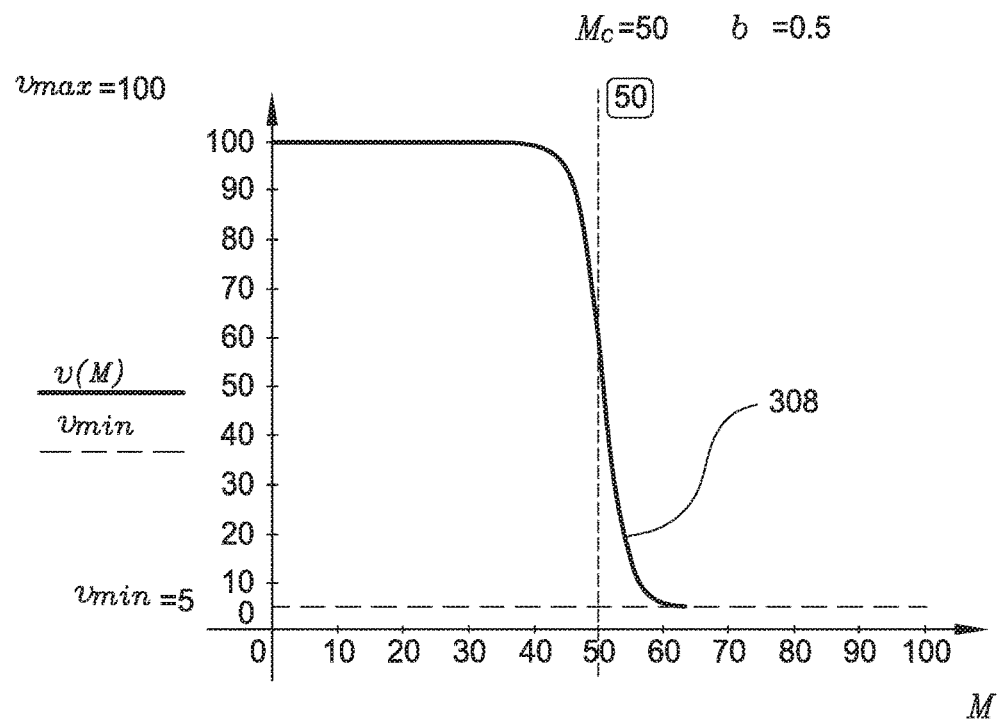
FIG. 3C is a schematic graph of a speed-torque curve based on another modified sigmoidal function.

FIG. 3C is a schematic graph of another exemplary speed-torque curve 308 according to the customized sigmoidal function. Parameters for the speed-torque curve 308 are identical to the speed-torque curve 306 except the gradient b is set to be 0.5. The larger value of the gradient b results in a steeper speed-torque curve.

Even though a sigmoidal function is used in the set point calculator 232, other suitable functions may be used in alternative.

The set point calculator 239 in the control program 230 automatically reduces the relative rotation speed to zero when a target torque, which may be set to the optimum torque, is reached. The control program 230 may be selectively activated to control at least a portion of a makeup operation. The control program 230 may be activated from the beginning of the makeup operation. However, running the control program 230 from the beginning will take a relatively long time to complete the makeup operation.

In one embodiment, the control program 230 may be activated to control the power tong 206 at the final stage of a makeup operation. For example, the control program 230 may be activated when the measured torque reaches a shoulder target torque value and the set point calculator 239 in the control program is activated when the measured torque reaches a pre-determined start value. In one embodiment, a makeup operation may begin with one or more relative rotation sections at constant rotation speed while continuously measuring the torque between the tubulars. After the set point calculator 239 in the control program 230 is activated, the control program 230 automatically reduces the rotational speed until the relative rotation completely stops at a target torque.

To reduce makeup time, it is desirable to activate the set point calculator 239 in the control program 230 as late as possible. In one embodiment, the start point may be selected according to the system reaction time and the target torque. In one embodiment, the start point torque value may be calculated by subtracting a system reaction torque allowance from the target torque:

$$M_{start} = M_{target} - \Delta M \quad (3)$$

wherein $M_{start}$ denotes the measured torque value corresponding to the start point of the set point calculator 239 in the control program 230 for automatic speed reduction; $M_{target}$ denotes the target torque for the completed connection (in one embodiment, the target torque corresponds to the optimum target of tubulars being connected); and $\Delta M$ denotes the system reaction torque allowance.

In one embodiment, the system reaction torque allowance $\Delta M$ may be calculated from residual turns the system will do after receiving a stop command. The residual turns may be calculated from experimentally determined system reaction time and the current speed. For example, the residual turns may be calculated by multiplying the system reaction time and the current speed:

$$\Delta n = t_{system} * v \quad (4)$$

wherein $\Delta n$ denotes residual turns the system will do after receiving a stop command; $t_{system}$ denotes system reaction time (in minute); and v denotes the current rotational speed (in RPM).

The system reaction torque allowance may be obtained by calculating increased torque during the system reaction time as a result from the residual turns and the change of torque per turns:

$$\Delta M = \Delta n * \left(\frac{\partial M}{\partial n}\right) + \Delta n^2 * \left(\frac{\partial M}{\partial n}\right)^2 \quad (5)$$

where n denotes turns of the tubulars. When the relative rotation of the tubulars is almost a constant speed when receiving the stop command, derivatives of measured torque by time may be used in place of the derivatives of torque by turns in equation (5).

Figure 4:
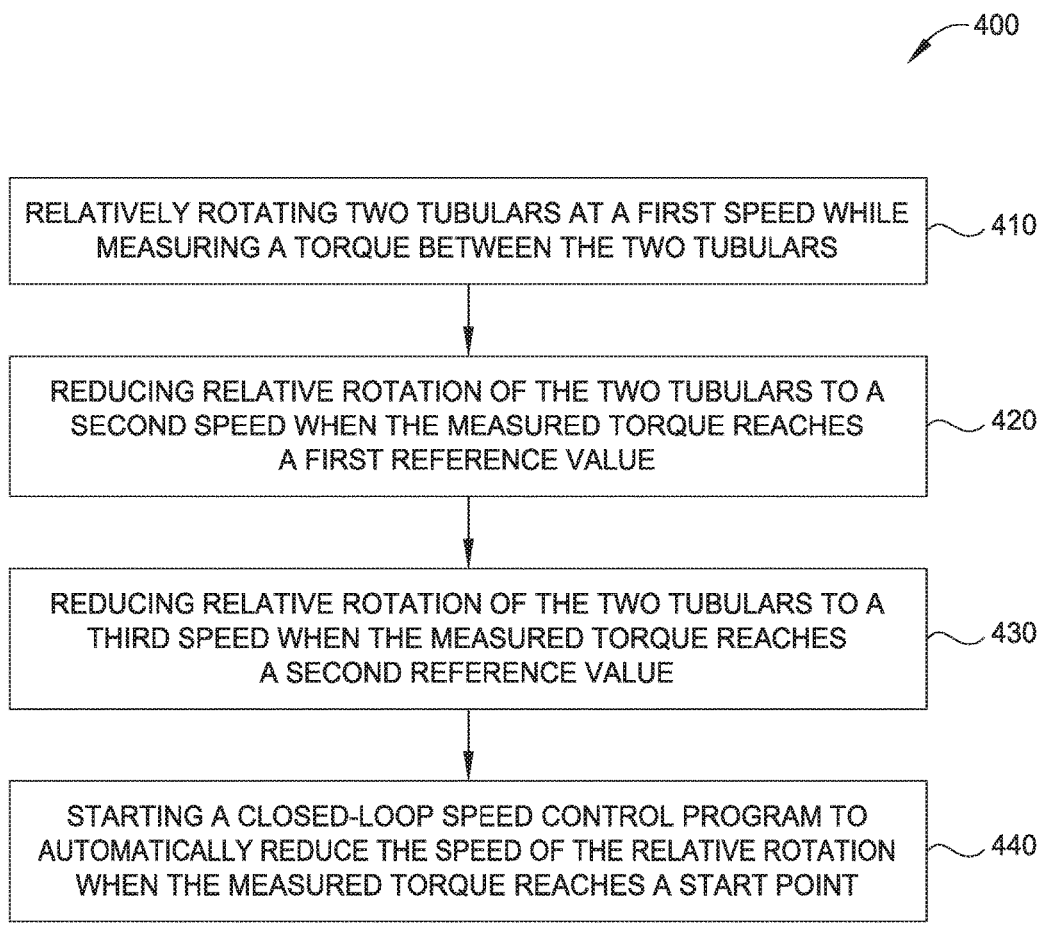
FIG. 4 is a flow chart of a method for making up a tubular joint according to one embodiment of the present disclosure.
Figure 5:
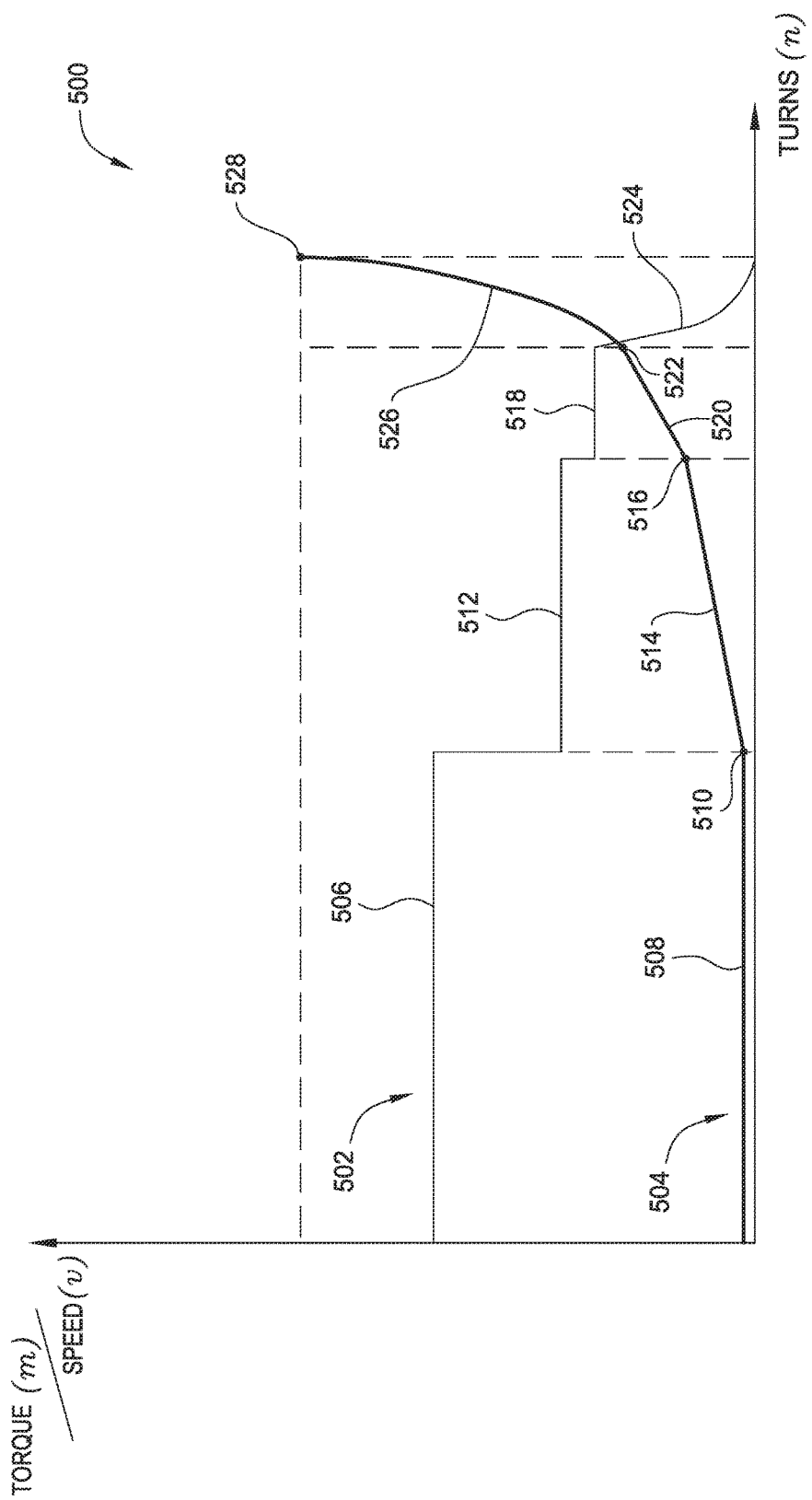
FIG. 5 shows schematic speed-turn curve and torque-turn curve of a makeup operation according to one embodiment of the present disclosure.

FIG. 4 is a flow chart of a method 400 for making up a tubular joint according to one embodiment of the present disclosure. The method 400 may be performed by a tubular makeup system, such as the tubular makeup system 200 of FIG. 2A. FIG. 5 includes a schematic speed-turn curve 502 and a schematic torque-turn curve 504 during a makeup operation according to the method 400.

In box 410 of the method 400, two tubulars are rotated relatively to each other to engage threaded portions of the two tubulars while monitoring the torque between the tubulars. In one embodiment, the torque may be monitored by continuously measuring a load cell in the load path, such as the load cell 228 in the tubular makeup system 200. In one embodiment, the tubulars may be rotated at a first constant speed. For example, the tubulars may be rotated while a drive unit, such as the drive unit 224 of the power tong 206, is maintained at a high gear. Section 506 of the speed-turn curve 502 reflects the speed during operation according to box 410. Operations according to the box 410 may be performed when the tubulars are in the spin-in position as shown in FIG. 1A.

Section 508 of the torque-turn curve 504 reflects the measured torque during operation according to box 410. During the operation according to box 410, the measured torque is nearly zero.

In box 420, the speed of relative rotation is reduced when the measured torque reaches a first reference torque value. In one embodiment, the first reference torque value may correspond to an increased value from the nearly zero torque during the spin-in position. The torque value between the tubulars increases after the tubulars reach the sealing position as shown in FIG. 1B. As the torque increases to the first reference torque value, the speed of relative rotation may be reduced from the first constant speed to a second constant speed. In one embodiment, the second constant speed may be a full speed on lower gear and reducing the relative rotation corresponds to switching from high gear to low gear. In one embodiment, the second constant speed may be achieved by switching on the switch 233 in the control program 230 of FIG. 2B.

Point 510 on the torque-turn curve 504 corresponds to the first reference torque value. Section 512 on the speed-turn curve 502 reflects the rotational speed during the operation of box 420. Section 514 on the torque-turn curve 504 reflects the measured torque during the operation of box 420.

In box 430, the speed of relative rotation is reduced when the measured torque reaches a second reference torque value. In one embodiment, the second reference torque value may correspond to a minimum shoulder target value of the tubulars to prevent the tubulars from moving too fast into the shoulder position as shown in FIG. 1C. As the torque increases to the second reference torque value, the speed of relative rotation may be reduced from the second constant speed to a third constant speed. In one embodiment, the third constant speed may be achieved by switching on the switch 235 in the control program 230 of FIG. 2B.

Point 516 on the torque-turn curve 504 corresponds to the second reference torque value. Section 518 on the speed-turn curve 502 reflects the rotational speed during the operation of box 430. Section 520 on the torque-turn curve 504 reflects the measured torque during the operation of box 430.

In box 440, an automatic speed reduction operation is activated when the measured torque reaches a predetermined start point torque. In one embodiment, the start point torque may be dynamically determined according to the system reaction time and the target torque. For example, the start point torque may be calculated according to equations (3), (4), and (5).

In one embodiment, the automatic speed reduction operation may correspond to the set point calculator 239 in the control program 230 of FIG. 2B. The rotational speed may be set as a sigmoidal function of the measured torque and controlled by a closed-loop controller, such as a PID controller. In one embodiment, the sigmoidal function may be customized according to parameters of the tubular makeup system and the tubulars being connected. For example, the set point of the rotational speed may be set based on the measured torque value according to the sigmoidal function of equation (2). The sigmoidal function allows the relative rotation to stop almost immediately at the target torque which avoids an over torque in the connection.

Point 522 on the torque-turn curve 504 corresponds to the start point torque value. Section 524 on the speed-turn curve 502 reflects the rotational speed during the operation of box 440. Section 526 on the torque-turn curve 504 reflects the measured torque during the operation of box 440. Point 528 indicates the final torque, which corresponds to the target torque.

In one embodiment, when the measured torque reaches a dump torque value during box 410, 420, 430, or 440, the rotational speed is set to zero.

The method 400 may be used to makeup tubular joints automatically or semi-automatically. In one embodiment, the continued torque measurement during method 400 may be used to generate a torque-turn curve, as shown in the FIG. 5, for evaluation of the tubular connection. The evaluation may be performed automatically using a computer program or manually by operators.

Even though a tong assembly is described in the above embodiments, embodiments of the present disclosure may be used to reach target torque without overtorque in any tubular makeup systems having a power clamp, such as overdrives, bucking units, horizontal makeup units for pipe mills, stand mills, and offline stand building facility. Embodiments of the present disclosure may be used to control relative rotational speeds between a power clamp holding a first tubular and a back clamp holding a second tubular using measured torque to reach a target torque between the first tubular and second tubulars without overtorque.

Embodiments of the present disclosure include a method for making up a tubular joint. The method includes rotating a first tubular relative to a second tubular to engage the first and second tubulars while measuring a torque between the first and second tubulars, calculating a set point of a relative rotational speed between the first and second tubulars using the measured torque, and using the calculated set point with a closed-loop controller to control the relative rotational speed between the first and second tubulars.

In one or more embodiment, calculating the set point comprises calculating the set point using a function of the measured torque in which an increase in the measured torque results in a decrease in the relative rotational speed, and a target torque value corresponds to a zero speed.

In one or more embodiment, the function is a sigmoidal function.

In one or more embodiment, the method further includes determining parameters of the sigmoidal function according to parameters of a drive unit used to rotating the first tubular relative to the second tubular and parameters of the first and second tubulars.

In one or more embodiment, the method further includes activating a set speed calculator in the closed-loop controller when the measured torque reaches a start point.

In one or more embodiment, the method further includes comprising dynamically calculating the start point according to a system reaction time and a target torque value.

In one or more embodiment, dynamically calculating the start point comprises calculating a system reaction torque allowance from the system reaction time and a current value of the relative rotational speed, and subtracting the system reaction torque allowance from the target torque value.

In one or more embodiment, calculating the system reaction torque allowance includes determining a residual turns according to the system reaction time and the current value of the relative rotational speed, and calculating the system reaction torque allowance from the residual turns and derivatives of the measured torque by turns.

In one or more embodiment, rotating the first tubular relative to the second tubular comprises prior to the measured torque reaches the start point, rotating the first tubular relative to the second tubular at a first constant speed.

In one or more embodiment, rotating the first tubular relative to the second tubular further comprises prior to the measured torque reaches the start point, reducing the relative rotational speed from the first constant speed to a second constant speed when the measured torque reaches a first reference value.

In one or more embodiment, the first reference value is a minimum shoulder torque of the first and second tubulars.

Embodiments of the present disclosure further include a method for making up a tubular joint. The method includes relatively rotating a first tubular to a second tubular to engage the first tubular and the second tubular while measuring a torque between the first and second tubulars, and automatically reducing a speed of relative rotation between the first and second tubulars using a closed-loop controller when the measured torque reaches a start point.

In one or more embodiment, the method further includes calculating a set point of the speed of relative rotation for the closed-loop controller using the measured torque between the first and second tubulars.

In one or more embodiment, calculating the set point comprises calculating the set point from the measured torque using a sigmoid function.

In one or more embodiment, the method further includes selecting parameters of the sigmoid function based on parameters of a drive unit used to rotate the first tubular relative to the second tubular and parameters of the first and second tubulars.

In one or more embodiment, the method further includes dynamically calculating the start point from a current relative rotational speed and a target torque value.

In one or more embodiment, dynamically calculating the start point comprises calculating a system reaction torque allowance from the system reaction time and a current value of the relative rotational speed, and subtracting the system reaction torque allowance from the target torque value.

In one or more embodiment, calculating the system reaction torque allowance includes determining a residual turns according to the system reaction time and the current value of the relative rotational speed, and calculating the system reaction torque allowance from the residual turns and derivatives of the measured torque by turns.

In one or more embodiment, the method further includes relatively rotating the first tubular to the second tubular at a first constant speed, and reducing the first constant speed to a second constant speed when the measured torque reaches a first reference value.

In one or more embodiment, the method further includes evaluating quality of the tubular joint according to the measured torque value.

Embodiments of the present disclosure further provide a tubular makeup system. The tubular makeup system includes a tubular makeup assembly comprising a first clamp for clamping to a first tubular, and a second clamp for clamping to a second tubular, wherein the first clamp and the second clamp are arranged to rotate the second tubular relative to the first tubular to make a tubular connection. The tubular makeup system further includes a controller including a control program, when operating, controlling a relative rotational speed between the first clamp and second clamp using a closed-loop controller, and calculating a set point for the closed-loop controller from a measured torque value between the first and second tubulars.

In one or more embodiment, the tubular makeup assembly is one of a tong assembly, an overdrive, a bucking unit, and a horizontal makeup unit.

Embodiments of the present disclosure further provide a tubular makeup system. The tubular makeup system includes a tong assembly comprising a backup tong for clamping to a first tubular, and a power tong for clamping to a second tubular and rotating the second tubular relative to the first tubular. The system further includes a controller coupled to the tong assembly, wherein the controller includes a control program, when operating, controlling a rotational speed of the power tong using a closed-loop controller, and calculating a set point for the closed-loop controller from a measured torque value between the first and second tubulars.

While the foregoing is directed to embodiments of the present disclosure, other and further embodiments may be devised without departing from the basic scope thereof, and the scope thereof is determined by the claims that follow.

The invention claimed is:

1. A method for making up a tubular joint, comprising:
   rotating a first tubular relative to a second tubular to engage the first and the second tubulars while measuring a torque between the first and second tubulars;
   calculating a set point of a relative rotational speed between the first and the second tubulars using the measured torque;
   using the calculated set point with a controller to control the relative rotational speed between the first and second tubulars, wherein the calculated set point is fed to the controller as an input value; and
   activating a set speed calculator in the controller when the measured torque reaches a start point torque value.

2. The method of claim 1, wherein calculating the set point comprises using a function of the measured torque in which an increase in the measured torque results in a decrease in the relative rotational speed, and a target torque value corresponds to a zero speed.

3. The method of claim 2, wherein the function is a sigmoidal function.

4. The method of claim 3, further comprising determining parameters of the sigmoidal function according to parameters of a drive unit used to rotate the first tubular relative to the secondh tubular and parameters of the first and second tubulars.

5. The method of claim 1, further comprising dynamically calculating the start point torque value according to a system reaction time and a target torque value.

6. The method of claim 5, wherein dynamically calculating the start point torque value comprises:
   calculating a system reaction torque allowance from the system reaction time and a current value of the relative rotational speed; and
   subtracting the system reaction torque allowance from the target torque value.

7. The method of claim 6, wherein calculating the system reaction torque allowance comprises:
   determining a residual turns according to the system reaction time and the current value of the relative rotational speed; and
   calculating the system reaction torque allowance from the residual turns and derivatives of the measured torque by turns.

8. The method of claim 1, wherein rotating the first tubular relative to the second tubular comprises:
   prior to the measured torque reaching the start point torque value, rotating the first tubular relative to the second tubular at a first constant speed.

9. The method of claim 8, wherein rotating the first tubular relative to the second tubular further comprises:
   prior to the measured torque reaches the start point torque value, reducing the relative rotational speed from the first constant speed to a second constant speed when the measured torque reaches a first reference value, wherein the first reference value is a minimum shoulder torque of the first and second tubulars.

10. The method of claim 1, wherein rotating the first tubular relative to the second tubular comprises rotating a pin of the first tubular relative to a box of the second tubular.

11. A method for making up a tubular joint, comprising:
    relatively rotating a first tubular to a second tubular to engage the first tubular and the second tubular while measuring a torque between the first and second tubulars;
    reducing a speed of relative rotation between the first and second tubulars using a controller when the measured torque reaches a start point torque value; and
    dynamically calculating the start point torque value from a current relative rotational speed and a target torque value, wherein dynamically calculating the start point torque value comprises:
       calculating a system reaction torque allowance from a system reaction time and a current value of the relative rotational speed; and
       subtracting the system reaction torque allowance from the target torque value.

12. The method of claim 11, further comprising calculating a set point of the speed of relative rotation for the controller using the measured torque between the first and second tubulars.

13. The method of claim 11, wherein calculating the system reaction torque allowance comprises:
    determining a residual turns according to the system reaction time and the current value of the relative rotational speed; and
    calculating the system reaction torque allowance from the residual turns and derivatives of the measured torque by turns.

14. The method of claim 11, further comprising:
    relatively rotating the first tubular to the second tubular at a first constant speed; and
    reducing the first constant speed to a second constant speed when the measured torque reaches a first reference value.

15. The method of claim 11, further comprising evaluating quality of the tubular joint according to the measured torque value.

16. A method for making up a tubular joint, comprising:
    rotating a first tubular relative to a second tubular to engage the first tubular and the second tubular while measuring a torque between the first and second tubulars;

reducing a speed of relative rotation between the first and second tubulars using a controller when the measured torque reaches a start point torque value; and calculating a set point of the speed of relative rotation for the controller using the measured torque between the first and second tubulars, wherein calculating the set point comprises calculating the set point from the measured torque using a sigmoid function.

17. The method of claim 16, further comprising selecting parameters of the sigmoid function based on parameters of a drive unit used to rotate the first tubular relative to the second tubular and parameters of the first and second tubulars.

18. A tubular makeup system, comprising:
a tubular makeup assembly comprising:
a first clamp for clamping to a first tubular; and
a second clamp for clamping to a second tubular, wherein the first clamp and the second clamp are arranged to rotate the second tubular relative to the first tubular to make a tubular connection; and a controller including instructions, which when executed, perform operations comprising:
controlling a relative rotational speed between the first clamp and second clamp using the controller;
calculating a set point for the controller from a measured torque value between the first and second tubulars, wherein the calculated set point is fed to the controller as an input value; and
activating a set speed calculator in the controller when a measured torque reaches a start point torque value.

19. The system of claim 18, wherein the tubular makeup assembly is one of a tong assembly, an overdrive, a bucking unit, and a horizontal makeup unit.

* * * * *